April 13, 1948.　　　　R. W. KERR　　　　2,439,393
SYNCHRONIZED CONTROL UNIT
Filed Aug. 3, 1945
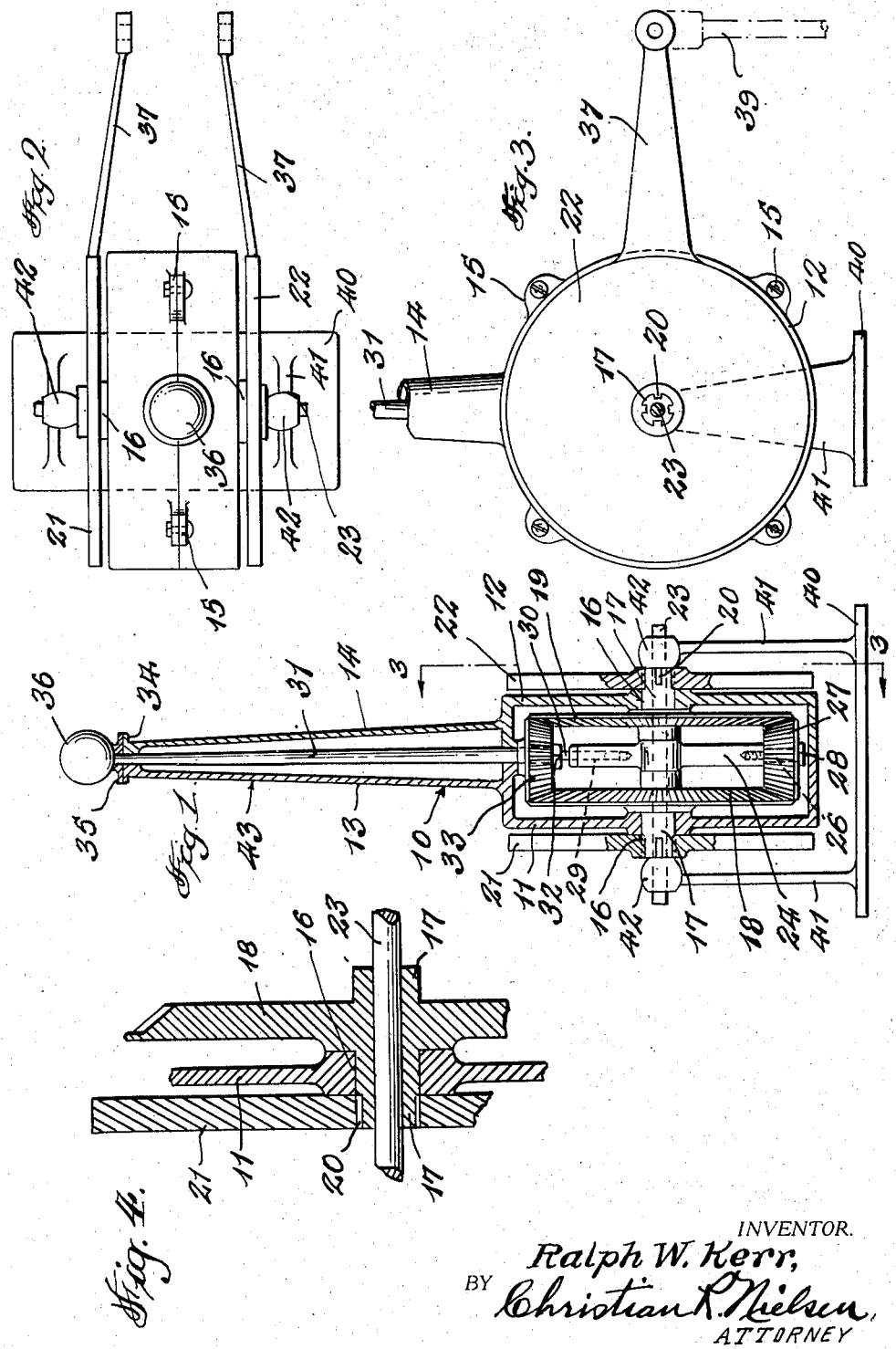
INVENTOR.
Ralph W. Kerr,
BY Christian R. Nielsen,
ATTORNEY Patented Apr. 13, 1948

2,439,393

UNITED STATES PATENT OFFICE 2,439,393

SYNCHRONIZED CONTROL UNIT

Ralph W. Kerr, Bowman, N. Dak.

Application August 3, 1945, Serial No. 608,627

2 Claims. (Cl. 74—471)

This invention relates to a control unit for synchronous control of a pair of like or unlike units and it consists in the constructions, arrangements and combinations herein described and claimed.

It is a particular object of the invention to provide a control unit embodying a single control lever for simultaneously actuating a pair of remotely located instruments or devices, or to actuate one instrument or device independently of the other to any desired degree.

It is also an object of the invention to provide a control unit of simple construction and light in weight which will make it particularly desirable for use in connection with units of aircraft to be controlled, for instance, in the control of the engines thereof.

Additional objects, advantages and features of invention will be apparent from the following description and accompanying drawing, wherein Figure 1 is a vertical section through the control unit, Figure 2 is a top plan view thereof, Figure 3 is a sectional view on the line 3—3 of Figure 1.

Figure 4 is an enlarged fragmentary sectional view illustrating the gear mounting.

There is shown a control unit 10 consisting of two annular casings 11 and 12 of identical construction, each including an integral handle section 13 and 14. The casings and the handle sections are abutted and bolted together as indicated at 15, forming a housing for mounting of the operating means, now to be described.

The casings 11 and 12 are formed with an axial hub 16 within which there is mounted a hub 17 of respective bevel gears 18 and 19, these hubs being of a length so as to project beyond the outer faces of the casings, where the hubs are formed with splines 20 for mounting of disks 21 and 22 rigidly upon respective hubs exteriorly of the casings.

A shaft 23 is extended through the aligned hubs 17 of the gears 18 and 19 and between the gears there is positioned freely upon the shaft 23, a gear mounting arm 24. One end of the arm is provided with a reduced end 26 for mounting of an idler gear 27 in mesh with gears 18 and 19, the gear 27 being secured to the arm by means of a bolt 28 threadedly engaged in the end of the arm. The opposite end of the arm is formed with a bore 29 adapted to receive the reduced end 30 of an operating shaft 31. The end 30 is threaded to receive a nut 32 for securing a bevel gear 33 and in order that the gear may be actuated by the operating shaft 31, the gear will be keyed or otherwise secured to the shaft.

The handle sections 13 and 14 are of tapered semicircular formation, the upper ends terminating in flat bearing plates 34 forming a seat for flat bearing plate 35 of a hand knob 36 secured to the upper end of the operating shaft 31.

The disks 21 and 22 are each provided with an integral radially extended arm 37, as may be seen in Figures 2 and 3, of any suitable length, the ends being each provided with an opening 38 for operative connection with a link 39, the latter being extended and connected with the units to be controlled, the latter not being illustrated.

Any suitable means are provided for support of the unit, and in the present instance, I have shown a bracket 40 consisting of spaced uprights 41 having bearings 42 through which the shaft 23 is extended.

In certain cases, where a multiplicity of units are to be controlled, it is contemplated to mount a number of control units in a side by side relation, using a single shaft 23 for support of the several units, and in order to avoid interference between the units, the arms 37 may be formed inwardly divergent as shown in Figure 2.

The operation of the control unit will be substantially as follows, it being assumed that the arms 37 are connected respectively to throttles of engines upon the left and right of an aircraft.

If a simultaneous advance or retardation of the throttles is desired, a forward or backward movement is given the control lever, generally indicated by the reference character 43. The casings 11 and 12 will be rotated about the hubs 17 of the gears, and since the gear 33 is in mesh with gears 18 and 19, these will move in unison, effecting the desired movement of the disks 21 and 22 and their associated arms 37, to advance or retard the throttles of the engines. However, should it be desired to advance the speed of one engine and retard the other, the knob 36 is rotated in the desired direction. For instance, if the engine to the left is to be retarded, the knob 36 is rotated in that direction, effecting rotation of the shaft 31 and associated gear 33. The gear 33 would rotate the gear 18 and disk 21 to retard the arm 37, while gear 19 would be advanced in the opposite direction to advance the setting of its associated disk and arm to increase the speed of the engine upon the right side of a craft. If it is desired to retard the engine on the right side and advance the speed of the engine on the left, the operation is just reversed.

While I have shown and described a preferred form of the device, this is by way of illustration only, and I consider as my own all such modifications in construction as fairly fall within the scope of the appended claims.

I claim:

1. A control unit for remotely located instruments comprising an oscillatable housing, a hand lever for oscillating said housing, a pair of bevel gears within the housing, said gears each having a hub including an axial opening, said hub being of a length extending exteriorly of the housing, a disk fixed to each extended hub portion, a shaft journalled through the aligned openings of said gears, each disk having an arm for connection to an instrument to be controlled, an operating shaft journalled within said hand lever and a bevel gear on said shaft in mesh with said first named gears.

2. A control unit for remotely located instruments comprising a housing having an integral hand lever, said housing being of annular hollow form and having an axial opening in opposed walls thereof, a pair of bevel gears within the housing each gear including a hub journalled in respective openings of the walls and having a portion extended exteriorly thereof, the hubs of the gears having an axial opening, a disk member fixed to each hub exteriorly of the housing, each disk including a radially extended arm, said arms having means for connection to an instrument to be controlled, a shaft journalled in the openings of said hubs, a gear-mounting arm on said shaft disposed between said gears, an idler gear mounted upon one end of said last named arm in mesh with said bevel gears, an operating shaft journalled in said hand lever and being rotatably supported in the other end of said gear-mounting arm, and a bevel gear fixed upon said operating shaft in mesh with said first named gears.

RALPH W. KERR.

REFERENCES CITED

The following references are of record in the file of this patent:

UNITED STATES PATENTS

| Number | Name | Date |
|---|---|---|
| 1,807,848 | Kollinek | June 2, 1931 |
| 1,869,326 | Ludlow | July 26, 1932 |
| 1,889,295 | Rosatelli | Nov. 29, 1932 |
| 2,235,013 | De Pew | Mar. 18, 1941 |
| 2,313,763 | Putt | Mar. 16, 1943 |

FOREIGN PATENTS

| Number | Country | Date |
|---|---|---|
| 527,508 | Germany | June 18, 1931 |